(12) United States Patent
Yang et al.

(10) Patent No.: US 11,490,170 B2
(45) Date of Patent: Nov. 1, 2022

(54) METHOD FOR PROCESSING VIDEO, ELECTRONIC DEVICE, AND STORAGE MEDIUM

(71) Applicant: BEIJING BAIDU NETCOM SCIENCE AND TECHNOLOGY CO., LTD., Beijing (CN)

(72) Inventors: Hu Yang, Beijing (CN); Shu Wang, Beijing (CN); Xiaohan Zhang, Beijing (CN); Qi Wang, Beijing (CN); Zhifan Feng, Beijing (CN); Chunguang Chai, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/243,055

(22) Filed: Apr. 28, 2021

(65) Prior Publication Data

US 2021/0250666 A1 Aug. 12, 2021

(30) Foreign Application Priority Data

Jun. 11, 2020 (CN) .......................... 202010532039.3

(51) Int. Cl.
*H04N 21/845* (2011.01)
*G06F 16/783* (2019.01)
(Continued)

(52) U.S. Cl.
CPC ....... *H04N 21/8456* (2013.01); *G06F 16/784* (2019.01); *G06F 16/7867* (2019.01); *G06V 40/169* (2022.01); *H04N 21/8455* (2013.01)

(58) Field of Classification Search
CPC ............ H04N 21/8456; H04N 21/8455; G06F 16/784; G06F 16/7867; G06V 40/169
See application file for complete search history.

(56) References Cited

U.S. PATENT DOCUMENTS 6,961,954 B1 * 11/2005 Maybury .............. G06F 16/745
725/53
8,667,158 B2 * 3/2014 Jin .................... H04N 21/23418
709/231
(Continued)

FOREIGN PATENT DOCUMENTS

CN 102547139 A 7/2012
CN 108810569 A 11/2018
(Continued)

OTHER PUBLICATIONS

Extended European Search Report for Application No. 21170889.6, dated Jun. 22, 2021, 14 pages.
(Continued)

*Primary Examiner* — Sunghyoun Park
(74) *Attorney, Agent, or Firm* — Fay Sharpe LLP

(57) ABSTRACT

The disclosure provides a method for processing a video, an electronic device, and a computer storage medium. The method includes: determining a plurality of first identifiers related to a first object based on a plurality of frames including the first object in a target video; determining a plurality of attribute values associated with the plurality of first identifiers based on a knowledge base related to the first object; determining a set of frames from the plurality of frames, in which one or more attribute values associated with one or more first identifiers determined from each one of the set of frames are predetermined values; and splitting the target video into a plurality of video clips based on positions of the set of frames in the plurality of frames.

14 Claims, 5 Drawing Sheets

(51) Int. Cl.
  *G06F 16/78* (2019.01)
  *G06V 40/16* (2022.01)

(56) References Cited

U.S. PATENT DOCUMENTS

| | | | |
|---|---|---|---|
| 2015/0082349 A1 | 3/2015 | Ishtiaq et al. | |
| 2015/0339303 A1* | 11/2015 | Perlegos | G06F 16/7867 707/756 |
| 2016/0034712 A1* | 2/2016 | Patton | G06F 16/29 726/28 |
| 2016/0132717 A1 | 5/2016 | Iliadis et al. | |
| 2019/0116101 A1* | 4/2019 | Harb | H04L 65/80 |
| 2019/0362024 A1* | 11/2019 | Brousseau | G06F 16/9535 |

FOREIGN PATENT DOCUMENTS

| | | |
|---|---|---|
| CN | 109635154 A | 4/2019 |
| CN | 109933688 A | 6/2019 |
| CN | 110121118 A | 8/2019 |
| JP | 2002149672 A | 5/2002 |
| JP | 2005210573 A | 8/2005 |

OTHER PUBLICATIONS

Andrew Merlino et al., "Broadcast News Navigation Using Story Segmentation", The MITRE Corporation, Advanced Information Systems Center, Nov. 30, 1997, 12 pages.
Tarek Zlitne et al., "Automatic Topics Segmentation for TV News Video Using Prior Knowledge", Multimed Tools Appl. (2016), Mar. 15, 2015, 28 pages.
First Office Action for Chinese Application No. 202010532039.3, dated Feb. 18, 2022, 8 pages.
Second Office Action for Chinese Application No. 202010532039.3, dated Apr. 29, 2022, 7 pages.
Office Action for Japanese Application No. 2021-079649, dated Jul. 12, 2022, 2 pages.

* cited by examiner

METHOD FOR PROCESSING VIDEO, ELECTRONIC DEVICE, AND STORAGE MEDIUM

CROSS-REFERENCE TO RELATED APPLICATION

This application claims a priority to Chinese Patent Application No. 202010532039.3, filed on Jun. 11, 2020, the contents of which are incorporated herein by reference in their entirety.

TECHNICAL FIELD

Embodiments of the disclosure relates to the field of image processing, and more particular to, a method for processing a video, an apparatus for processing a video, an electronic device, and a computer storage medium.

BACKGROUND

Videos such as news videos generally include a plurality of sub-news in series, and users are often interested in one or more news events instead of all news. Conventional video splitting techniques mainly rely on manual editing to obtain the edited clip, and news item-related text description is pushed with the edited clip after matching with the edited clip. This process is inefficient. There are some conventional technologies that rely on scene features, mute features, or face similarity features before and after for splitting. However, these features need to be carefully designed and have poor adaptability and scalability.

SUMMARY

Embodiments of the disclosure provide a method for processing a video, an apparatus for processing a video, an electronic device, and a computer storage medium.

In a first aspect, embodiments of the disclosure provide a method for processing a video. The method includes: determining a plurality of first identifiers related to a first object based on a plurality of frames including the first object in a target video; determining a plurality of attribute values associated with the plurality of first identifiers based on a knowledge base related to the first object; determining a set of frames from the plurality of frames, in which one or more attribute values associated with one or more first identifiers determined from each one of the set of frames are predetermined values; and splitting the target video into a plurality of video clips based on positions of the set of frames in the plurality of frames.

In a second aspect, embodiments of the disclosure provide an electronic device. The electronic device includes: at least one processor, and a memory communicatively connected to the at least one processor. The memory stores instructions executable by the at least one processor, and when the instructions are executed by the at least one processor, the at least one processor is caused to implement the method according to the first aspect of the disclosure.

In a third aspect, embodiments of the disclosure provide a computer-readable storage medium storing computer instructions. When the instructions are executed, the at least one processor is caused to implement the method according to the first aspect of the disclosure.

It should be understood that the content described in this section is not intended to identify the key or important features of the embodiments of the disclosure, nor is it intended to limit the scope of the disclosure. Additional features of the disclosure will be easily understood by the following description.

BRIEF DESCRIPTION OF THE DRAWINGS

The above and/or additional aspects and advantages of embodiments of the disclosure will become apparent and more readily appreciated from the following descriptions made with reference to the drawings, and same or similar annotations indicate the same or similar elements in the drawings, in which.

DETAILED DESCRIPTION

Figure 1:
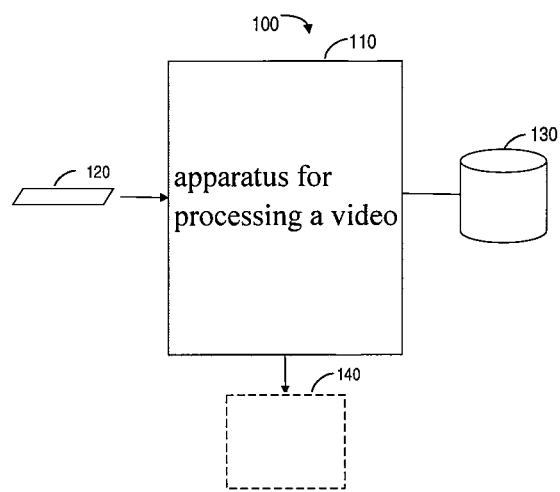
FIG. 1 is a schematic diagram of an information processing environment 100 according to some embodiments of the disclosure.

The following describes the exemplary embodiments of the disclosure with reference to the accompanying drawings, which includes various details of the embodiments of the disclosure to facilitate understanding, which shall be considered merely exemplary. Therefore, those of ordinary skill in the art should recognize that various changes and modifications ran be made to the embodiments described herein without departing from the scope and spirit of the disclosure. For clarity and conciseness, descriptions of well-known functions and structures are omitted in the following description.

In the description of the embodiments of the disclosure, the term "comprising" and similar terms should be understood inclusively as "comprising but not limited to". Unless otherwise stated, the term 'or' means "and/or". The term "based on" should be understood as "based at least in part on". The term "one embodiment" or "the embodiment" should be understood as "at least one embodiment". The term "another embodiment" means "at least one additional embodiment". The terms "first", "second" and the like may refer to different or the same object. Additional explicit and implicit definitions may be described below.

As mentioned above, when conventional manual editing is used for video splitting, even professional and experienced editors cannot achieve accurate splitting of massive videos. When splitting is performed relying on scene features, mute features, and face similarity features before and after, these features need to be carefully designed and could not be used directly when the current news media video changes to another news media video without special deployment, and the transferability and scalability may be poor. In addition, conventional video splitting and video semantic understanding are often separated. After splitting the video, entities and events need to be extracted for a second time. Therefore, the video production efficiency and retrieval efficiency may be low.

In order to at least partially solve one or more of the above problems and other potential problems, example embodiments of the disclosure provide a solution for processing a video. In this solution, a plurality of first identifiers related to a first object are determined based on a plurality of frames including the first object in a target video, a plurality of attribute values associated with the plurality of first identifiers are determined based on a knowledge base related to the first object, a set of frames are determined from the plurality of frames, in which one or more attribute values associated with one or more first identifiers determined from each one of the set of frames are predetermined values, and the target video is splitted into a plurality of video clips based on positions of the set of frames in the plurality of frames.

Thus, it is possible to determine the set of frames corresponding to one or more identifiers whose associated attribute values are the predetermined value by determining the identifiers of the object in the frames and the attribute values associated with the identifiers. Based on the positions of the frames in this set of frames, the target video is splitted into the plurality of video clips. This solution does not require elaborate design features, has strong applicability, and is convenient for system migration.

Hereinafter, specific examples of this solution are described in more detail with reference to the accompanying drawings.

FIG. 1 is a schematic diagram of an information processing environment 100 according to some embodiments of the disclosure. The information processing environment 100 may include an apparatus for processing a video 110, a target video 120, a knowledge base 130, and a plurality of video clips 140.

The apparatus 110 includes, for example, but is not limited to, a personal computer, a server computer, a multi-processor system, a mainframe computer, a distributed computing environment including any of the above systems or devices. In some embodiments, the apparatus 110 may have one or more processing units, including dedicated processing units such as graphics processing units (GPUs), field programmable gate arrays (FPGAs), and application-specific integrated circuits (ASICs), and general-purpose processing units such as central processing units (CPUs).

The target video 120 includes, for example, but is not limited to, a video including news content. The news content includes, for example, a host's introduction section and a news report section.

The knowledge base 130 includes, for example, identifiers related to objects and attribute values associated with the identifiers. Objects include, but are not limited to people. The identifiers include, but are not limited to, names, such as a person's name. The attribute values include, but are not limited to, occupations such as a host, a government official, an athlete and a star. For example, the knowledge base 130 includes data such as "Zhang San (a person's name), host", "Li Si (person's name), athlete", and "Wang Wu (person's name), government official".

The apparatus 110 may access the knowledge base 130 to obtain relevant information. The knowledge base 130 may be located inside or outside the apparatus 110. For example, the apparatus 110 may obtain the attribute values associated with the identifiers from the knowledge base 130 based on the identifiers.

The apparatus 110 is configured to determine a plurality of first identifiers related to a first object based on a plurality of frames including the first object in a target video 120, to determine a plurality of attribute values associated with the plurality of first identifiers based on a knowledge base 130 related to the first object, to determine a set of frames from the plurality of frames, in which one or more attribute values associated with one or more first identifiers determined from each one of the set of frames are predetermined values, and to split the target video into a plurality of video clips 140 based on positions of the set of frames in the plurality of frames.

Thus, it is possible to determine the set of frames corresponding to one or more identifiers whose associated attribute values are the predetermined value by determining the identifiers of the object in the frames and the attribute values associated with the identifiers. Based on the positions of the frames in this set of frames, the target video is splitted into the plurality of video clips. This solution does not require elaborate design features, has strong applicability, and is convenient for system migration.

Figure 2:
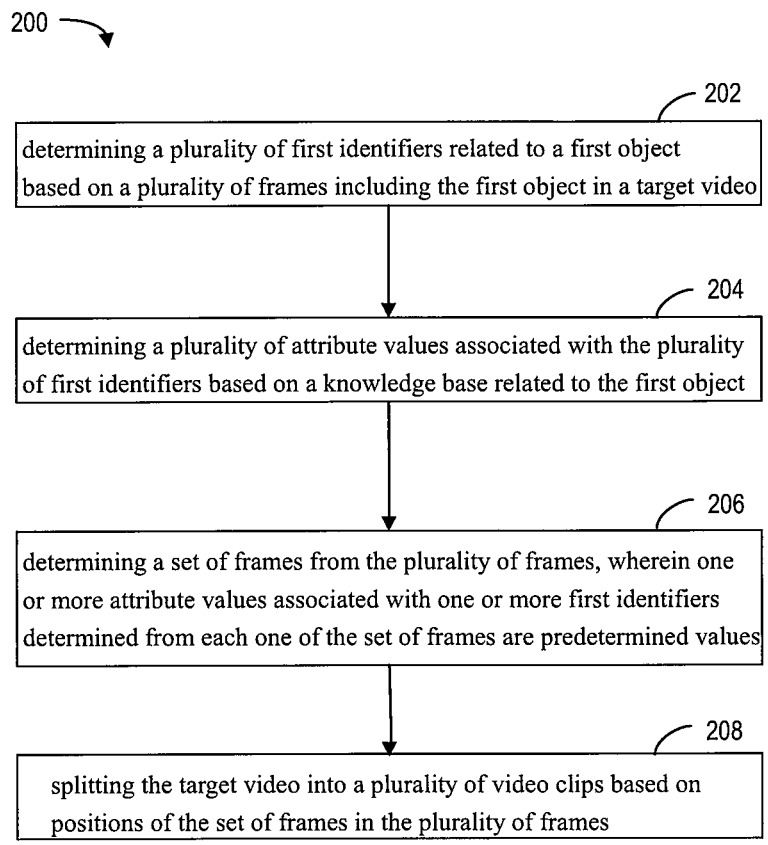
FIG. 2 is a schematic diagram of a method 200 for processing a video according to some embodiments of the disclosure.

FIG. 2 is a schematic diagram of a method 200 for processing a video according to some embodiments of the disclosure. For example, the method 200 may be executable by the apparatus 110 as illustrated in FIG. 1. It should be understood that the method 200 may further include additional blocks not shown and/or omitted blocks, and the scope of the disclosure is not limited in this respect.

At block 202, the apparatus 110 for processing a video determines a plurality of first identifiers related to a first object based on a plurality of frames including the first object in a target video 120.

Figure 6:
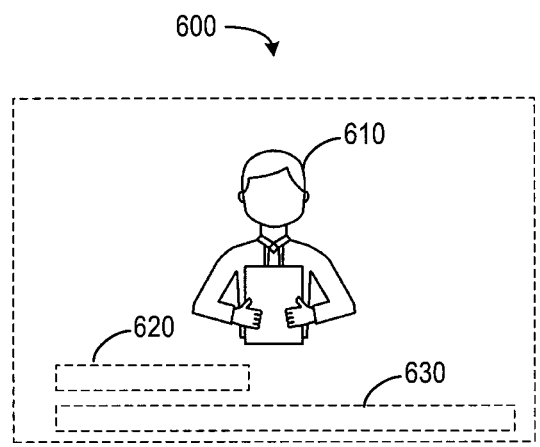
FIG. 6 is a schematic diagram of a video frame 600 according to some embodiments of the disclosure.

The target video 120 includes, but is not limited to, a video including news content, for example, the news content has a host's introduction section and a news report section. The first object includes, but is not limited to a person. The first identifier includes, but is not limited to a name. For example, as illustrated in FIG. 6, a frame 600 includes a host 610, the name of the host 610, such as Li San, is determined. For example, a neural network model is configured to determine the identifier.

In some embodiments, a confidence of each identifier of the plurality of first identifiers exceeds a threshold value. For example, the knowledge base 130 is configured to verify the identifiers to determine the identifier whose confidence exceeds the threshold value. For the identifier whose confidence does not exceed the threshold value, this identifier may be corrected based on the knowledge base 130. As a result, a high-confidence identifier is obtained to improve the accuracy of subsequent processing.

Alternatively, or additionally, in some embodiments, the apparatus 110 may perform face recognition on frames at a predetermined interval in the target video to obtain the plurality of frames including the first object. The predetermined interval includes a predetermined frame interval, for example, every 5 frames or 10 frames. In addition, the predetermined interval may also include a predetermined time interval, for example, every 1 second or every 0.5 second. The apparatus 110 may determine the plurality of first identifiers related to the first object based on the plurality of frames. As a result, the plurality of frames including the first object are screened more accurately through face recognition, which facilitates identifier determination.

At block 204, the apparatus 110 determines a plurality of attribute values associated with the plurality of first identifiers based on a knowledge base 130 related to the first object.

The knowledge base 130 includes, for example, identifiers related to the first object and attribute values associated with the identifiers. The attribute value includes, but is not limited to, a specific occupation, such as a host, a politician and a celebrity. By searching for an identifier, such as Li San, in the knowledge base, the attribute value associated with the identifier, such as the host, is obtained.

At block 206, the apparatus 110 determine a set of frames from the plurality of frames, in which one or more attribute values associated with one or more first identifiers determined from each one of the set of frames are predetermined values. The predetermined value is used to indicate a specific attribute, for example, to indicate a specific occupation such as a host or a reporter.

At block 208, the apparatus 110 splits the target video into a plurality of video clips based on positions of the set of frames in the plurality of frames. For example, based on continuity of the positions of the set of frames in the plurality of frames, the target video is splitted into the plurality of video clips, which is described in detail below in combination with FIG. 3.

Thus, by determining the identifiers of the object in the frames and the attribute values associated with the identifiers, the set of frames corresponding to one or more identifiers whose associated attribute values are the predetermined value may be determined. Based on the positions of the frames in the set of frames, the target video is splitted into the plurality of video clips. This solution does not require elaborate design features, has strong applicability, and is convenient for system migration.

Figure 3:
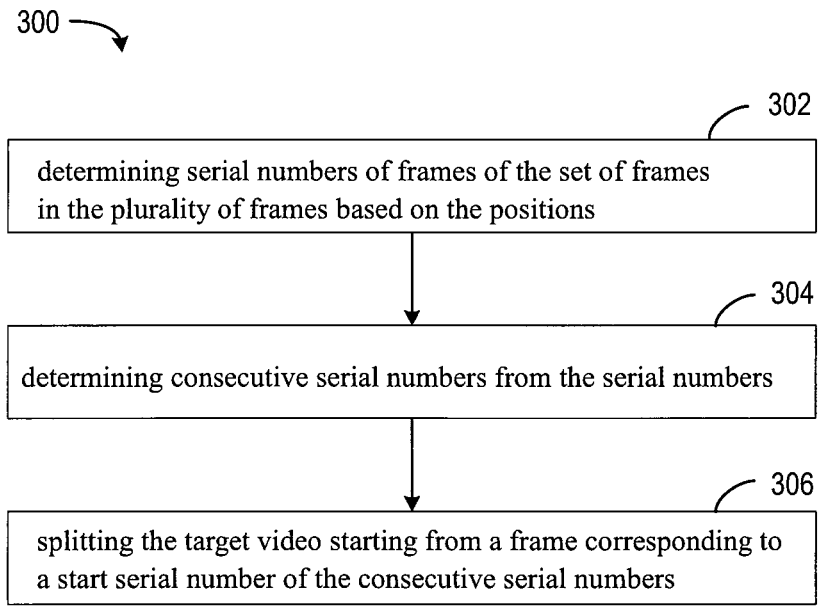
FIG. 3 is a schematic diagram of a method 300 for processing a target video into a plurality of video clips according to some embodiments of the disclosure.

FIG. 3 is a schematic diagram of a method 300 for processing a target video into a plurality of video clips according to some embodiments of the disclosure. For example, the method 300 may be executable by the apparatus 110 as shown in FIG. 1. It should be understood that the method 300 may further include additional blocks not shown and/or omitted blocks, and the scope of the disclosure is not limited in this respect.

At block 302, the apparatus 110 determines serial numbers of frames of the set of frames in the plurality of frames based on the positions.

For example, if the plurality of frames may be the first, fifth, tenth, fifteenth, and twentieth frames in the target video, and the set of frames may be the first, fifth, fifteenth, and twentieth frames, the serial number of the set of frames in the plurality of frames are 1, 2, 4, and 5.

At block 304, the apparatus 110 determines consecutive serial numbers from the serial numbers. For example, for the first, fifth, tenth, fifteenth, and twentieth frames in the video, and the serial numbers corresponding to the first, fifth, fifteenth, and twentieth frames in the first, fifth, tenth, fifteenth, and twentieth frames are 1, 2, 4, and 5, the apparatus 110 determines the serial numbers 1 and 2 in the serial numbers of 1, 2, 4, and 5, as the consecutive numbers, and serial numbers 4 and 5 are also the consecutive serial numbers.

At block 306, the apparatus 110 splits the target video from a frame corresponding to a start serial number of the consecutive serial numbers. The frames between the frame corresponding to the previous starting serial number and the frame corresponding to the next starting serial number are splitted into one video clip.

For example, for consecutive serial numbers 1 and 2, the starting serial number is 1, and the frame corresponding to the starting serial number 1 is the first frame. For consecutive serial numbers 4 and 5, the starting serial number is 4, and the frame corresponding to the starting serial number 4 is the fifteenth frame. In this case, the apparatus 110 may split the target video according to the first frame and the fifteenth frame, for example, the first frame to the fourteenth frame are splitted into the same video clip, and the fifteenth frame to the last frame are splitted into another video clip. It should be understood that the above is only an example and not a limitation, and the plurality of frames, the set of frames, serial numbers, consecutive serial numbers, the starting serial number, and the frame corresponding to the starting serial number may all be other suitable situations.

Thus, through the continuity of the serial numbers of the set of frames in the plurality of frames, the target video is splitted in a simple and efficient manner, and the processing efficiency is improved.

Figure 4:
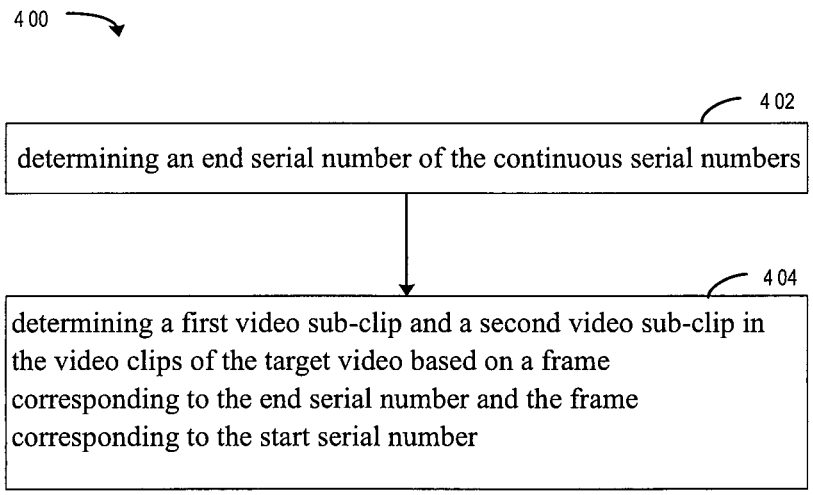
FIG. 4 is a schematic diagram of a method 400 for splitting a target video according to some embodiments of the disclosure.

FIG. 4 is a schematic diagram of a method 400 for splitting a target video according to some embodiments of the disclosure. For example, the method 400 may be executable by the apparatus 110 as shown in FIG. 1. It should be understood that the method 400 may further include additional blocks not shown and/or omitted blocks, and the scope of the disclosure is not limited in this respect.

At block 402, the apparatus 110 determines an end serial number of the continuous serial numbers. The example used in the embodiment of FIG. 3 is continued, where for the consecutive serial numbers 1 and 2, the ending serial number is 2. For the consecutive serial numbers 4 and 5, the ending serial number is 5.

At block 404, the apparatus 110 determines a first video sub-clip and a second video sub-clip in the video clips of the target video based on a frame corresponding to the end serial number and the frame corresponding to the start serial number. The frame corresponding to the start serial number to the frame corresponding to the end serial number are splitted into the first video sub-clip, and the frame after the frame corresponding to the end serial number to the end frame of the video clip are splitted into the second video sub-clip.

For example, for the starting serial number 1, the frame corresponding to the starting serial number is the first frame. For the starting serial number 4, the frame corresponding to the starting serial number is the fifteenth frame. For the end serial number 2, the frame corresponding to the end serial number is the fifth frame. For the end serial number 5, the frame corresponding to the end serial number is the twentieth frame. For example, a video clip of the target video is from the first frame to the fourteenth frame, then the first video sub-clip in the video clip is from the first frame to the fifth frame, and the second video sub-clip in the video is from the sixth frame to the fourteenth frame.

In this way, a video clip is splitted into two video sub-clips based on the continuity of the serial numbers of the set of frames in the plurality of frames, which is simple and efficient.

Alternatively, or additionally, in some embodiments, the apparatus 110 may obtain a plurality of first texts from a plurality of frames. For example, the apparatus 110 may use optical character recognition (OCR) technology to obtain the plurality of first texts from the plurality of frames. As illustrated in FIG. 6, text may be displayed in the frame. For example, a text 620 may display content related to a current frame, and a text 630 may display content unrelated to the current frame, such as scrolling news. In some embodiments, a confidence of each first text in the plurality of first texts exceeds a threshold value. For example, the plurality of first texts may be corrected based on the knowledge base to determine the first text whose confidence exceeds the threshold value, and the first text whose confidence does not exceed the threshold value may be corrected based on the knowledge base. As a result, the confidence of the first text is improved, and the accuracy of subsequent processing is improved.

Figure 7:
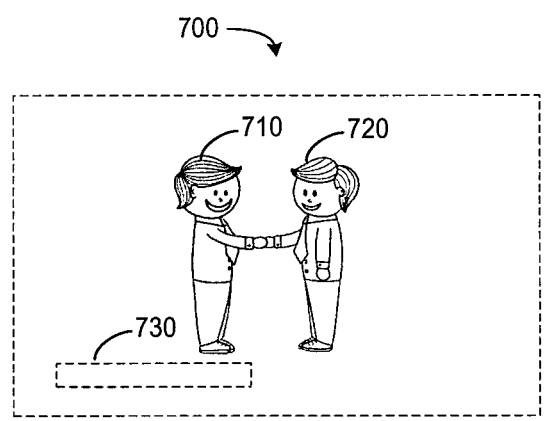
FIG. 7 is a schematic diagram of a video frame 700 according to some embodiments of the disclosure.

After acquiring the plurality of first texts, the apparatus 110 may acquire a plurality of first entities from the plurality of first texts. For example, the apparatus 110 may use an entity extraction model to obtain the plurality of first entities from the plurality of first texts. The first entities may include, but are not limited to, for example, names of persons, names of places or names of organizations. As illustrated in FIG. 7, when the first text 730 obtained from the frame includes content such as "Wang Wu meets Li Si", the obtained first entities may include two names, i.e., "Wang Wu" and "Li Si". In some embodiments, a confidence of each first entity in the plurality of first entities exceeds a threshold value. For example, the plurality of first entities may be corrected based on the knowledge base and/or the plurality of first identifiers to determine the first entity whose confidence exceeds the threshold value. For the first entity whose confidence does not exceed the threshold value, the first entity may be corrected based on the knowledge base and/or the plurality of first identifiers. As a result, the confidence of the first entity is improved, which is convenient for improving the accuracy of subsequent processing.

After acquiring the plurality of first entities, the apparatus 110 may determine the plurality of events associated with the plurality of video clips based on the plurality of first texts and the plurality of first entities. For example, the first text may correspond to the video clip according to a correspondence between the first texts and the frames. Subsequently, an event extraction model is configured to extract events associated with the video clip based on the first texts and the first entities corresponding to the video clip. In addition, a database associated with the events, such as a news event graph, is used to verify the event.

As a result, it is possible to realize semantic understanding of videos in the process of video splitting, and to realize association between events and video clips, thereby realizing an automated pipeline management from video splitting to video semantic understanding, and efficiently supporting production and distribution of videos, for example, in a news field.

Alternatively, or additionally, in some embodiments, the apparatus 110 may obtain a plurality of initial texts from the plurality of frames. Subsequently, the apparatus 110 may remove content irrelevant to the plurality of frames from the plurality of initial texts to obtain the plurality of first texts. As a result, irrelevant content in the text is removed, and processing efficiency and accuracy are improved.

Alternatively, or additionally, in some embodiments, the apparatus 110 determines the content irrelevant to the plurality of frames based on a font size of contents in the initial text. For example, the content with a font size smaller than a threshold may be determined as the content irrelevant to the plurality of frames. For example, the content with the small font in the frames of a news screen generally indicates rolling news, and has nothing to do with the content in the current frame. In other embodiments, the apparatus 110 may determine the content irrelevant to the plurality of frames based on positions of contents in the initial text in the corresponding frame. For example, the content located at the bottom position in the corresponding frame may be determined as content irrelevant to the plurality of frames. As illustrated in FIG. 6, the content 630 located at the bottom position of the corresponding frame generally represents scroll information and has nothing to do with the content in the current frame. In another embodiment, the apparatus 110 may determine content irrelevant to the plurality of frames based on the font size of the contents in the initial text and position of the contents in the corresponding frame. For example, the above two manners are combined to determine the content irrelevant to the plurality of frames, which is not repeated here.

Thus, based on the font size of the contents and the positions of the contents in the frame, the content irrelevant to the plurality of frames is accurately determined.

Alternatively, or additionally, in some embodiments, the apparatus 110 determines a plurality of second texts based on audios corresponding to the plurality of frames in the target video. For example, voice recognition technology is used to convert audio corresponding to a plurality of frames of the target video into the plurality of second texts. Subsequently, the apparatus 110 may obtain a plurality of second entities from a plurality of second texts. For example, the entity extraction model is configured to obtain the second entities from the plurality of second texts. Then, the apparatus 110 may determine the plurality of events associated with the plurality of video clips based on the plurality of first texts, the plurality of first entities, the plurality of second texts, and the plurality of second entities. The specific process of determining the event is referred to above text, which is not repeated herein.

Thus, it is possible to reuse the text converted from the audio corresponding to the frame to determine the event on the basis of the text obtained from the frame, so that event determination is performed based on multi-dimensional data, which improves the accuracy.

Figure 5:
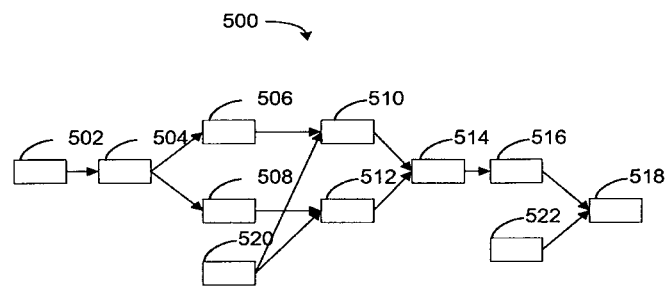
FIG. 5 is a schematic diagram of a video processing process 500 according to some embodiments of the disclosure.

FIG. 5 is a process 500 for processing a video according to some embodiments of the disclosure. The process includes video splitting and event determination. As illustrated in FIG. 5, at block 502, the apparatus 110 obtains a target video. Subsequently, at block 504, the apparatus 110 acquires frames at a predetermined interval from the target video. Subsequently, at block 506, the apparatus 110 performs OCR process on the frames to obtain the texts. After the texts are obtained at block 506, the texts are checked based on the knowledge base 520 at block 510, for example, a text with a confidence greater than a threshold is obtained. At block 508, the apparatus 110 performs face recognition on the frames to obtain identifiers related to the first object. After the identifiers related to the first object are obtained at block 508, the attribute values associated with the identifiers are obtained at block 512 based on the knowledge base, such as the host.

Subsequently, at block 514, video splitting may be performed to obtain video clips. There are many ways to split the video. For example, the frames in which the host appears continuously may be determined as an introduction section, and the frames from the end of the lead part to the next appearance of the host may be determined as the report section. At block 516, the apparatus 110 performs entity extraction on the texts obtained from the frames according to the video splitting. At block 518, the apparatus 110 determines events associated with the video clips based on the obtained texts and entities in combination with the event graph. For example, as illustrated in FIG. 7, when the video clip includes a picture of Wang Wu 710 meeting Li Si 720 and a text 730 about Wang Wu meeting Li Si, it is determined from the video clip that the event associated with the video clip is "Wang Wu meeting Li Si".

As a result, it is possible to realize video semantic understanding in the process of video splitting, and realize the correspondence between the events and the video clips, thereby realizing an automated pipeline arrangement from video splitting to video semantic understanding, and efficiently supporting production and distribution of the video in a news field.

Figure 8:
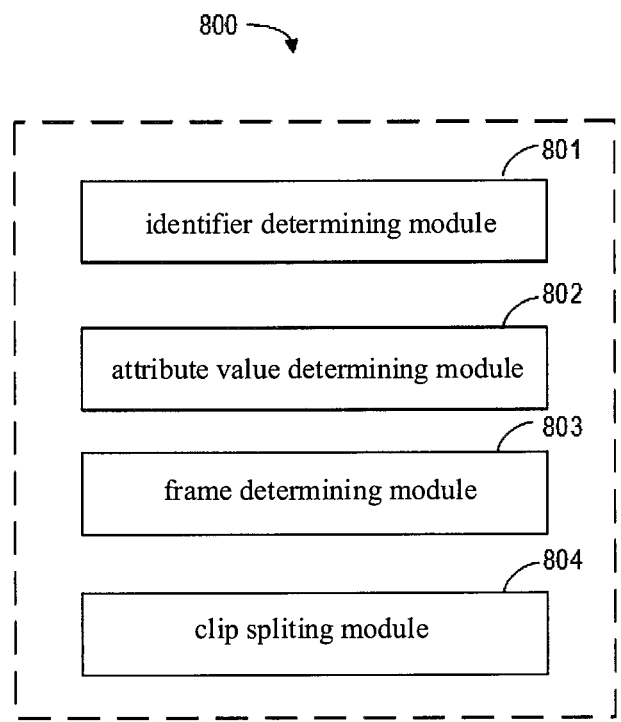
FIG. 8 is a schematic diagram of an apparatus 800 for processing a video according to some embodiments of the disclosure.

FIG. 8 is a schematic diagram of an apparatus 800 for processing a video according to some embodiments of the disclosure. As illustrated in FIG. 8, the apparatus 800 includes: an identifier determining module 801, an attribute value determining module 802, a frame determining module 803 and a clip splitting module 804.

The identifier determining module 801 is configured to determine a plurality of first identifiers related to a first object based on a plurality of frames including the first object in a target video. The attribute value determining module 802 is configured to determine a plurality of attribute values associated with the plurality of first identifiers based on a knowledge base related to the first object. The frame determining module 803 is configured to determine a set of frames from the plurality of frames, in which one or more attribute values associated with one or more first identifiers determined from each one of the set of frames are predetermined values. The clip splitting module 804 is configured to split the target video into a plurality of video clips based on positions of the set of frames in the plurality of frames.

Alternatively, or additionally, in some embodiments, the clip splitting module 804 includes: a serial number determining module, a consecutive serial number determining module and a splitting module. The serial number determining module is configured to determine serial numbers of frames of the set of frames in the plurality of frames based on the positions. The consecutive serial number determining module is configured to determine consecutive serial numbers from the serial numbers. The splitting module is configured to split the target video starting from a frame corresponding to a start serial number of the consecutive serial numbers.

Alternatively, or additionally, in some embodiments, the splitting module includes: an end serial number determining module and a sub-clip determining module. The end serial number determining module is configured to determine an end serial number of the continuous serial numbers. The sub-clip determining module is configured to determine a first video sub-clip and a second video sub-clip in the video clips of the target video based on a frame corresponding to the end serial number and the frame corresponding to the start serial number. In some embodiments, a confidence of each identifier of the plurality of first identifiers exceeds a threshold value.

Alternatively, or additionally, in some embodiments, the identifier determining module 801 includes: a face recognition module and a determining module. The face recognition module is configured to perform face recognition on frames at a predetermined interval in the target video to obtain the plurality of frames. The determining module is configured to determine the plurality of first identifiers based on the plurality of frames.

Alternatively, or additionally, in some embodiments, the apparatus 800 further includes: a first text acquiring module, a first entity acquiring module and an event determining module. The first text acquiring module is configured to acquire a plurality of first texts from the plurality of frames. The first entity acquiring module is configured to acquire a plurality of first entities from the plurality of first texts. The event determining module is configured to determine a plurality of events associated with the plurality of video clips based on the plurality of first texts and the plurality of first entities. In some embodiments, a confidence of each identifier of the plurality of first identifiers exceeds a threshold value.

Alternatively, or additionally, in some embodiments, the first text acquiring module includes: an initial text acquiring module and an irrelevant content removing module.

The initial text acquiring module is configured to acquire a plurality of initial texts from the plurality of frames. The irrelevant content removing module is configured to acquire the plurality of first texts by removing contents irrelevant to the plurality of frames from the plurality of initial texts.

Alternatively, or additionally, in some embodiments, the irrelevant content removing module comprises: an irrelevant content determining module, configured to determine the contents irrelevant to the plurality of frames based on at least one of font sizes of contents in the initial texts and positions of contents in the corresponding frames. In some embodiments, a confidence of each identifier of the plurality of first identifiers exceeds a threshold value.

Alternatively, or additionally, in some embodiments, the event determining module includes: a second text determining module, a second entity acquiring module and a determining module. The second text determining module is configured to determine a plurality of second texts based on audios corresponding to the plurality of frames in the target video. The second entity acquiring module is configured to acquire a plurality of second entities from the plurality of second texts. The determining module is configured to determine the plurality of events based on the plurality of first texts, the plurality of first entities, the plurality of second texts, and the plurality of second entities.

Figure 9:
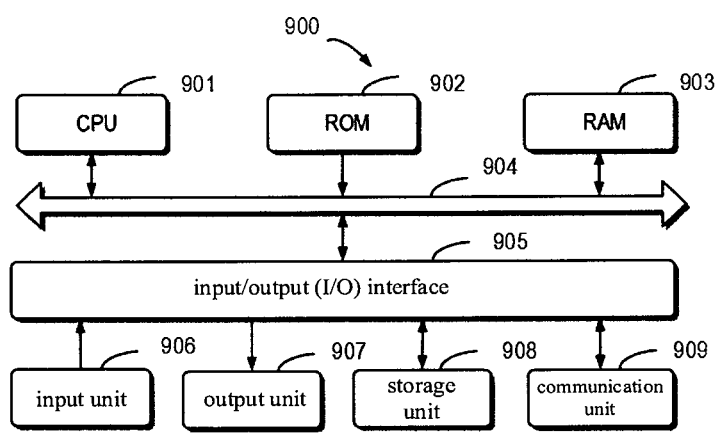
FIG. 9 is a block diagram of an electronic device used for implementing a method for processing a video according to some embodiments of the disclosure.

FIG. 9 is a block diagram of an example device 900 capable of implementing some embodiments of the disclosure. For example, the apparatus 110 for processing a video shown in FIG. 1 may be implemented by the device 900. As shown, the device 900 includes a central processing unit (CPU) 901 that performs various appropriate actions and processes according to computer program instructions stored in a read-only memory (ROM) 902 or computer program instructions loaded into a random access memory (RAM) 903 from a storage unit 908. In the RAM 903, various programs and data required for the operation of the device 900 can also be stored. The CPU 901, the ROM 902, and the RAM 903 are connected to each other through a bus 904. An input/output (I/O) interface 905 is also connected to a bus 904.

Components in the device 900 are connected to the I/O interface 905, including: an input unit 906, such as a keyboard, a mouse; an output unit 907, such as various types of displays, speakers; a storage unit 908, such as a disk, an optical disk; and a communication unit 909, such as network cards, modems, wireless communication transceivers, and the like. The communication unit 909 allows the device 900 to exchange information/data with other devices through a computer network such as the Internet and/or various telecommunication networks.

The various processes described above, such as the methods 200-500, may be performed by the processing unit 901. For example, in some embodiments, the methods 200-500 may be implemented as a computer software program that is tangibly embodied on a machine-readable medium, such as the storage unit 908. In some embodiments, part or all of the computer program may be loaded and/or installed on the device 900 via the ROM 902 and/or the communication unit 909. When a computer program is loaded into the RAM 903 and executed by the CPU 901, one or more steps of the methods 200-500 described above may be performed.

The disclosure may be a method, device, system, and/or computer program product. The computer program product may include a computer-readable storage medium on which computer-readable program instructions for performing various aspects of the disclosure are loaded.

A computer-readable storage medium may be a tangible device that can hold and store instructions used by the instruction execution device. The computer-readable storage medium may be, for example, but not limited to, an electric storage device, a magnetic storage device, an optical storage device, an electromagnetic storage device, a semiconductor storage device, or any suitable combination of the foregoing. More specific examples (non-exhaustive list) of computer-readable storage media include: portable computer disks, hard disks, random access memory (RAM), read-only memory (ROM), erasable programmable read-only memory (EPROM or flash memory), static random access memory (SRAM), portable compact disc read-only memory (CD-ROM), digital versatile disc (DVD), memory stick, floppy disk, mechanical encoding device, a protruding structure in the hole card or groove with instructions stored thereon, and any suitable combination of the above. Computer-readable storage media used herein are not to be interpreted as transient signals per se, such as radio waves or other freely propagating electromagnetic waves, electromagnetic waves propagating through waveguides or other transmission media (for example, light pulses through fiber optic cables), or electrical signal transmitted via electrical wires.

The computer-readable program instructions described herein can be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. The network adapter card or network interface in each computing/processing device receives computer-readable program instructions from the network and forwards the computer-readable program instructions for storage in a computer-readable storage medium in each computing/processing device.

The computer program instructions for performing the operations of the disclosure may be assembly instructions, instruction set architecture (ISA) instructions, machine instructions, machine-related instructions, microcode, firmware instructions, state setting data, or one or more source code or object code written in any combination of programming languages, including object-oriented programming languages—such as Smalltalk, C++, and conventional procedural programming languages—such as "C" or similar programming languages. Computer-readable program instructions may be executed entirely on the user's computer, partly on the user's computer, as a stand-alone software package, partly on the user's computer and partly on a remote computer, or entirely on a remote computer or server. In the case of a remote computer, the remote computer can be connected to the user's computer through any kind of networks, including local area networks (LAN) or wide area networks (WAN), or it can be connected to an external computer (such as through the Internet by an internet service provider). In some embodiments, the electronic circuit is personalized by using the state information of the computer-readable program instructions, such as a programmable logic circuit, a field programmable gate array (FPGA), or a programmable logic array (PLA). The electronic circuit may execute computer-readable program instructions to implement various aspects of the disclosure.

Various aspects of the disclosure are described herein with reference to flowcharts and/or block diagrams of methods, devices (systems) and computer program products according to embodiments of the disclosure. It should be understood that each block of the flowcharts and/or block diagrams, and combinations of blocks in the flowcharts and/or block diagrams, can be implemented by computer-readable program instructions.

These computer-readable program instructions can be provided to a processing unit of a general-purpose computer, special-purpose computer, or other programmable data processing device, thereby producing a machine such that when these instructions are processed by the processing units of a computer or other programmable data processing device, a device for implementing the functions/actions specified in one or more blocks in the flowcharts and/or block diagrams is generated. These computer-readable program instructions may also be stored in a computer-readable storage medium, and these instructions cause a computer, a programmable data processing apparatus, and/or other devices to work in a specific manner. Thus, a computer-readable medium storing instructions includes: an article of manufacture that includes instructions to implement various aspects of the functions/acts specified in one or more blocks in the flowchart and/or block diagram.

The computer-readable program instructions may also be loaded on a computer, other programmable data processing device, or other device, so that a series of operation steps are performed on the computer, other programmable data processing device, or other device to generate a computer implementation process, so that instructions executed on a computer, other programmable data processing device, or other device implement the functions/actions specified in one or more blocks in the flowchart and/or block diagram.

The flowchart and block diagrams in the figures show the architecture, functionality, and operation of possible implementations of systems, methods and computer program products according to various embodiments of the disclosure. In this regard, each block in the flowchart or block diagram may represent a module, a program segment, or a part of an instruction that contains one or more executable instructions for implementing a specified logical function. In some alternative implementations, the functions marked in the blocks may also occur in a different order than those marked in the drawings. For example, two consecutive blocks may actually be executed substantially in parallel, and they may sometimes be executed in the reverse order, depending on the functions involved. It should also be noted that each block in the block diagrams and/or flowcharts, and combinations of blocks in the block diagrams and/or flowcharts, can be implemented in a dedicated hardware-based system that performs the specified function or action, or it can be implemented with a combination of dedicated hardware and computer instructions.

The embodiments of the disclosure have been described above, the above description is exemplary, not exhaustive, and is not limited to the disclosed embodiments. Many modifications and variations will be apparent to those skilled in the art without departing from the scope and spirit of the various embodiments described. The terminology used herein is chosen to best explain the principles of the embodiments, practical applications or improvements to the technology in the market, or to enable others to understand the embodiments disclosed herein.

What is claimed is:

1. A method for processing a video, comprising:
  determining a plurality of first identifiers related to a first object based on a plurality of frames including the first object in a target video;
  determining a plurality of attribute values associated with the plurality of first identifiers based on a knowledge base related to the first object;
  determining a set of frames from the plurality of frames, wherein one or more attribute values associated with one or more first identifiers determined from each one of the set of frames are predetermined values;
  splitting the target video into a plurality of video clips based on positions of the set of frames in the plurality of frames;
  acquiring a plurality of first texts from the plurality of frames;
  acquiring a plurality of first entities from the plurality of first texts; and
  determining a plurality of events associated with the plurality of video clips based on the plurality of first texts and the plurality of first entities;
  wherein acquiring the plurality of first texts from the plurality of frames comprises:
    acquiring a plurality of initial texts from the plurality of frames; and
    acquiring the plurality of first texts by removing contents irrelevant to the plurality of frames from the plurality of initial texts; and
  wherein removing the contents irrelevant to the plurality of frames comprises:
    determining the contents irrelevant to the plurality of frames based on at least one of font sizes of contents in the initial texts and positions of contents in the corresponding frames.

2. The method according to claim 1, wherein splitting the target video into the plurality of video clips comprises:
  determining serial numbers of frames of the set of frames in the plurality of frames based on the positions;
  determining consecutive serial numbers from the serial numbers; and
  splitting the target video starting from a frame corresponding to a start serial number of the consecutive serial numbers.

3. The method according to claim 2, wherein splitting the target video comprises:
  determining an end serial number of the continuous serial numbers; and
  determining a first video sub-clip and a second video sub-clip in the video clips of the target video based on a frame corresponding to the end serial number and the frame corresponding to the start serial number.

4. The method according to claim 1, wherein a confidence of each identifier of the plurality of first identifiers exceeds a threshold value.

5. The method according to claim 1, wherein determining the plurality of first identifiers comprises:
  performing face recognition on frames at a predetermined interval in the target video to obtain the plurality of frames; and
  determining the plurality of first identifiers based on the plurality of frames.

6. The method according to claim 1, wherein a confidence of each first text in the plurality of first texts exceeds a threshold value.

7. The method according to claim 1, wherein a confidence of each first entity in the plurality of first entities exceeds a threshold value.

8. The method according to claim 1, wherein determining the plurality of events comprises:
  determining a plurality of second texts based on audios corresponding to the plurality of frames in the target video;
  acquiring a plurality of second entities from the plurality of second texts; and
  determining the plurality of events based on the plurality of first texts, the plurality of first entities, the plurality of second texts, and the plurality of second entities.

9. An electronic device, comprising:
  at least one processor; and a memory communicatively connected with the at least one processor; wherein, the memory stores instructions executable by the at least one processor, when the instructions are executed by the at least one processor, the at least one processor implements:
  determining a plurality of first identifiers related to a first object based on a plurality of frames including the first object in a target video;
  determining a plurality of attribute values associated with the plurality of first identifiers based on a knowledge base related to the first object;
  determining a set of frames from the plurality of frames, wherein one or more attribute values associated with one or more first identifiers determined from each one of the set of frames are predetermined values; and
  splitting the target video into a plurality of video clips based on positions of the set of frames in the plurality of frames;
  wherein when the instructions are executed by the at least one processor, the at least one processor further implements:
    acquiring a plurality of first texts from the plurality of frames;
    acquiring a plurality of first entities from the plurality of first texts; and
    determining a plurality of events associated with the plurality of video clips based on the plurality of first texts and the plurality of first entities;
  wherein acquiring the plurality of first texts from the plurality of frames comprises:
    acquiring a plurality of initial texts from the plurality of frames; and
    acquiring the plurality of first texts by removing contents irrelevant to the plurality of frames from the plurality of initial texts; and
  wherein removing the contents irrelevant to the plurality of frames comprises:
    determining the contents irrelevant to the plurality of frames based on at least one of font sizes of contents in the initial texts and positions of contents in the corresponding frames.

10. The electronic device according to claim 9, wherein splitting the target video into the plurality of video clips comprises:
  determining serial numbers of frames of the set of frames in the plurality of frames based on the positions;

determining consecutive serial numbers from the serial numbers; and splitting the target video starting from a frame corresponding to a start serial number of the consecutive serial numbers.

11. The electronic device according to claim 10, wherein splitting the target video comprises:

determining an end serial number of the continuous serial numbers; and determining a first video sub-clip and a second video sub-clip in the video clips of the target video based on a frame corresponding to the end serial number and the frame corresponding to the start serial number.

12. The electronic device according to claim 9, wherein determining the plurality of first identifiers comprises:

performing face recognition on frames at a predetermined interval in the target video to obtain the plurality of frames; and determining the plurality of first identifiers based on the plurality of frames.

13. The electronic device according to claim 9, wherein determining the plurality of events comprises:

determining a plurality of second texts based on audios corresponding to the plurality of frames in the target video;

acquiring a plurality of second entities from the plurality of second texts; and determining the plurality of events based on the plurality of first texts, the plurality of first entities, the plurality of second texts, and the plurality of second entities.

14. A non-transitory computer-readable storage medium storing computer instructions, wherein the computer instructions are configured to make a computer implement:

determining a plurality of first identifiers related to a first object based on a plurality of frames including the first object in a target video;

determining a plurality of attribute values associated with the plurality of first identifiers based on a knowledge base related to the first object;

determining a set of frames from the plurality of frames, wherein one or more attribute values associated with one or more first identifiers determined from each one of the set of frames are predetermined values;

splitting the target video into a plurality of video clips based on positions of the set of frames in the plurality of frames;

acquiring a plurality of first texts from the plurality of frames;

acquiring a plurality of first entities from the plurality of first texts; and determining a plurality of events associated with the plurality of video clips based on the plurality of first texts and the plurality of first entities;

wherein acquiring the plurality of first texts from the plurality of frames comprises:

acquiring a plurality of initial texts from the plurality of frames; and acquiring the plurality of first texts by removing contents irrelevant to the plurality of frames from the plurality of initial texts; and wherein removing the contents irrelevant to the plurality of frames comprises:

determining the contents irrelevant to the plurality of frames based on at least one of font sizes of contents in the initial texts and positions of contents in the corresponding frames.

\* \* \* \* \*